UNITED STATES PATENT OFFICE.

L. OTTO P. MEYER, OF NEWTOWN, CONNECTICUT.

IMPROVEMENT IN THE MANUFACTURE OF SAFETY-MATCHES.

Specification forming part of Letters Patent No. 111,075, dated January 17, 1871.

*To all whom it may concern:*

Be it known that I, L. OTTO P. MEYER, of Newtown, county of Fairfield, and State of Connecticut, have invented certain Improvements in the Manufacture of the Safety-Match, of which the following is a specification.

In the manufacture of the safety-match for which the patents of June 25, 1867, and of April 5, 1870, have been granted to me, certain difficulties were met with. After diligent search in market for a suitable gelatine or glue, and after trying various kinds, I did not find any which would not render my match-paste more or less froth like and too readily gelatinous, wherefore the dipping process failed to produce with the requisite practical certainty the desired result; and, further, I have observed that even the best gelatines are apt to cause a certain reaction in my match compound, whereby the matches lose some of the easy ignitibility on the prepared surface. The French white gelatine of first quality, as formerly found by me in market, suited my paste better than any other gelatine or glue, even better than J. & G. Cox's gelatine; but the French gelatine lately found in market under said name is a much stronger gelatine and far less suitable in preparing my paste according to my old mode. I am informed that in Europe some match-manufacturers prefer glue made from reindeer-horns; but such glue I was unable to find in the New York market, and I have no reason to believe that it would suit my paste any better than said strong French or Cox's gelatine.

With the view of rendering my match-paste better adapted for dipping, to avoid the froth-like condition of the paste and any disadvantageous reaction in the compound, I have made various experiments and found good success by the following:

Mode first. To prepare the gelatine solution by any of the variations designated in the following table, which gives, also, the most suitable proportions by weight.

| Gelatine-solution variation | A | B | C | D |
|---|---|---|---|---|
| Gelatine which easily gelatinates | 3 | — | 3 | — |
| J. & G. Cox's or strong gelatine | — | 3 | — | 3 |
| Distilled water | 6 | 7 | 6 | 6 |
| Acetic acid No. 8 | 1 | 3-5 | 2-3 | 3-5 |
| Alcohol | — | — | 1 | 1 |
| Temperature in degrees, Fahrenheit | 70-75 | 80 | 75 | 85 |

The proportions of water in the above table may be increased or diminished to suit the required consistency of the paste. The temperature noted in the above table indicates the lowest temperature suitable for grinding and dipping the paste if prepared with any of the above-given solutions; and, further, I have found most excellent results by the following:

Mode second. To prepare the gelatine with diluted solution of carbonate or bicarbonate of soda, or with lime-water; but I prefer said carbonates, and especially the bicarbonate. By way of experiment, I have taken said solutions instead of pure water for dissolving the gelatine; but the best results I have found by the following process: Weigh off all the ingredients for my match compound in proportions as given in the specification of my aforesaid patents, (but the strong French white gelatine is preferred by me for this mode.) Put pure rain-water, about twenty times the weight of the gelatine, in a jar or pot, and dissolve in it carbonate or bicarbonate of soda, one part to each one hundred parts of water, by weight. Then add the gelatine and allow it to stand in a cool place for about twenty-four hours, or till the gelatine has soaked as much as it can without melting or losing its good consistency. Said French gelatine will absorb about ten to twelve times its weight of water (or of said solution) in twenty-four hours. While the gelatine is soaking, stir or shake it up from time to time. When it is sufficiently soaked, pour off the surplus water, which contains impurities. (If a solution of carbonate of soda has been employed for soaking, then use plenty of pure water to wash the soaked gelatine till the poured-off water is nearly free from alkaline taste. If a solution of bicarbonate of soda has been employed, no washing is required.) Melt the soaked gelatine and then decant or strain it, and let the clear solution evaporate till it has acquired a consistency of about one part of gelatine to two to three parts of water, by weight. The heat employed for melting and evaporating may be as high as just a little below the boiling-point. (By way of experiment, I have employed heat below 158° Fahrenheit when the gelatine had been soaked in a solution of bicarbonate of soda; but I have found that a heat near the boiling-point answers just as well, provided the evaporation is not carried on further than aforesaid.) All vessels or pots employed in the preparation of the gelatine are best to be of saltglazed stoneware or of glazed or enameled iron. The gelatine, after being sufficiently evaporated, is ready to be mixed with the other ingredients. The grinding of the paste may be done at a temperature of about 80° Fahrenheit, and the dipping at about 80° to 85° Fahrenheit. The match-sticks require no previous dipping in paraffine; but the nature of the wood ought to be destroyed as much as possible by previous exposure to high heat. The drying process is as usual.

I prefer to wax-coat my improved match by the mode designated in the specification of my patent of April 5, 1870, as "variation A," with slight modifications. The temperature of the matches, to be suitable for dipping, may be 80° Fahrenheit, or higher—may be as high as the molten paraffine, the heat of the molten paraffine to be about 8° to 10° Fahrenheit above its congealing-point, the depth of the molten paraffine in the dipping-pan to be about three-fourths of an inch. When the match-sticks are of close-grained wood, paraffine-wax of low as well as of high congealing-point will answer; but whatever its congealing-point may be it may require refining, which I have done by heating it with lime-water and agitating both well.

Other particulars of the process are to be found in the specification of aforesaid patents.

What I desire to secure by Letters Patent, subordinate to my aforesaid patent of June 25, 1867, is—

In the manufacture of the safety-match, gelatine prepared with diluted acetic acid or with diluted solution of carbonate or bicarbonate of soda, substantially as described, and for the purposes set forth.

L. OTTO P. MEYER.

Witnesses:
HENRY SANFORD,
ELI C. BARNUM.